J. F. LINCOLN.
CHARGING SYSTEM FOR STORAGE BATTERIES.
APPLICATION FILED JAN. 5, 1912.
1,122,287.
Patented Dec. 29, 1914.
2 SHEETS—SHEET 2.
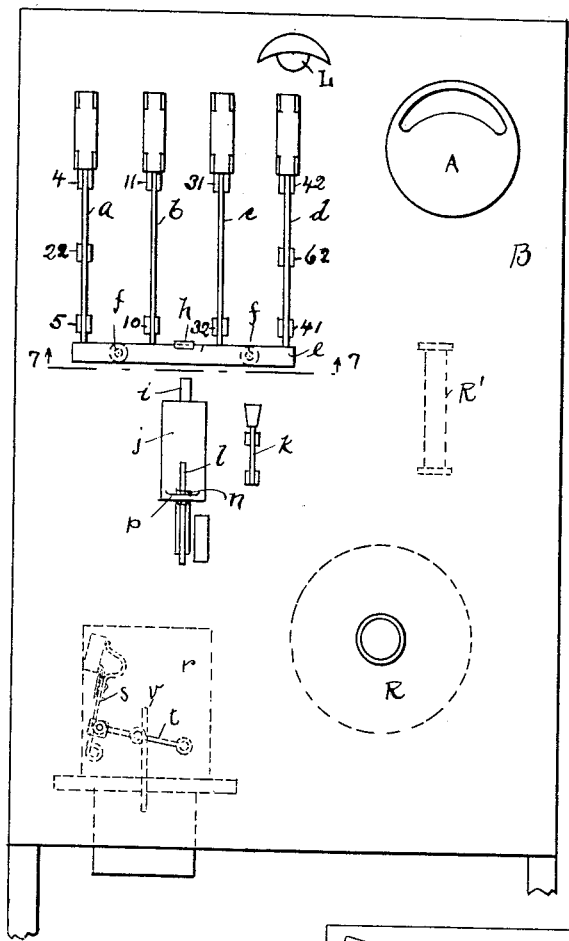
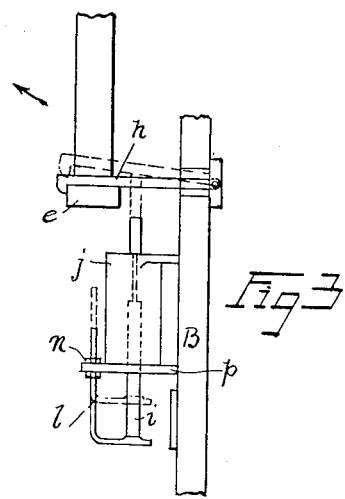
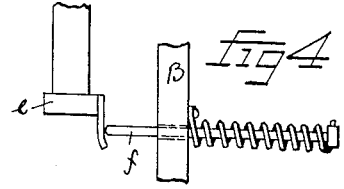
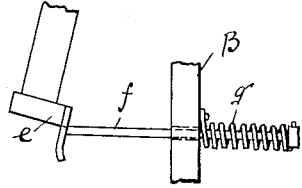
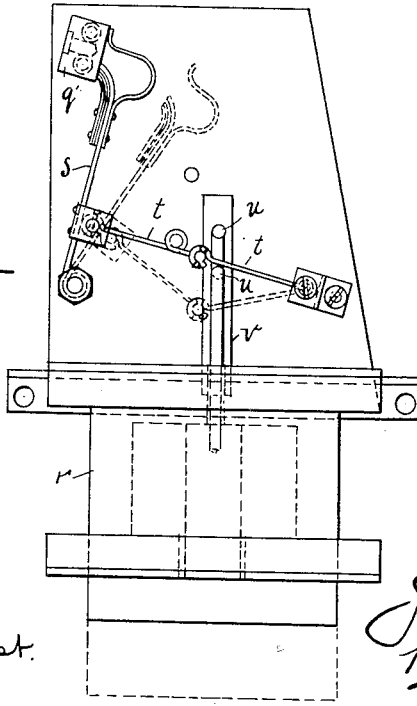
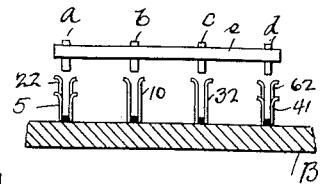

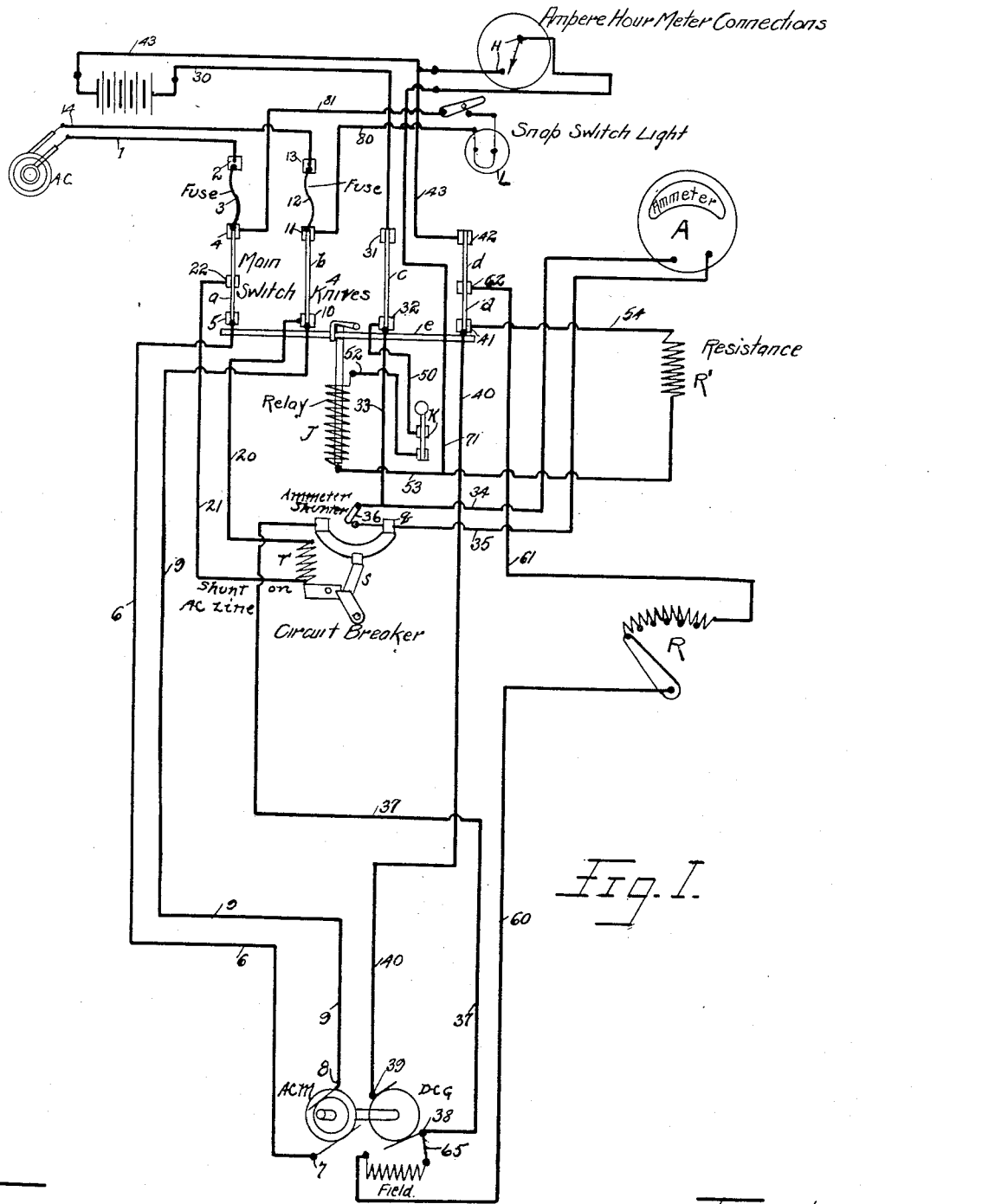

UNITED STATES PATENT OFFICE.

JAMES F. LINCOLN, OF EAST CLEVELAND, OHIO, ASSIGNOR TO THE LINCOLN ELECTRIC COMPANY, OF CLEVELAND, OHIO, A CORPORATION OF OHIO.

CHARGING SYSTEM FOR STORAGE BATTERIES.

1,122,287.      Specification of Letters Patent.     Patented Dec. 29, 1914.

Application filed January 5, 1912. Serial No. 669,565.

*To all whom it may concern:*

Be it known that I, JAMES F. LINCOLN, a citizen of the United States, residing at East Cleveland, in the county of Cuyahoga and State of Ohio, have invented a certain new and useful Improvement in Charging Systems for Storage Batteries, of which the following is a full, clear, and exact description, reference being had to the accompanying drawings.

This invention relates to motor-generator sets and controlling devices for charging storage batteries.

One of the objects of the invention is to provide such equipment in a form which shall be entirely automatic, when the connection to the battery is made, so that not only is the system automatically disconnected when the battery is fully charged, but the operation is also stopped in case of breakage in the battery line or the accidental pulling out of the charging plug.

Another object of the invention is to enable a single phase A. C. motor to drive the generator for supplying the direct current to the battery. My invention provides for this by enabling the starting of the A. C. single phase motor by the residual current in the battery and the automatic restarting of the A. C. motor if its current should stop and thereafter start again.

Another object of the invention is to provide for the starting of the mechanism from a very weak residual current in the battery.

Another object is the arrangement of the circuits and mechanism on a compact switch board easily installed and operated and not liable to get out of order.

My system provides a shunt wound generator which may operate as a motor by the residual current of the battery to speed up a single-phase A. C. motor coupled therewith. My generator is practically a constant current machine, the armature being wound so that it becomes a very strong magnet in comparison with the field, the result being that the voltage drops as the current increases, eliminating the necessity for resistance between the armature and battery and thereby making more efficient charging.

Another feature of my invention is that I close the field of the generator before closing the armature connections, with the result that a weak residual current of the battery may still charge the field and armature successively, though not sufficient to charge both field and armature simultaneously. This is of great value, for example, in charging a new Edison battery which is delivered to the customer discharged, and hence has only a very slight residual current, which, while sufficient to charge the field, is not sufficient to charge both field and armature simultaneously.

In the drawings, Figure 1 is a wiring diagram of a controlling switch board used in my system; Fig. 2 is a front elevation of the switch board; Fig. 3 is a side elevation of a magnetic latch for the main switch; Figs. 4 and 5 are fragmentary views in the nature of side elevations, illustrating two positions of the lower end of the switch; Fig. 6 is an elevation of the circuit breaker; Fig. 7 is a cross section through the switch board on the line 7—7 of Fig. 2 looking upward and showing the main switch.

I will first describe the arrangement of circuits, switches, etc., shown in the wiring diagram, Fig. 1. I will then describe the main switch, the relay for controlling it and the circuit breaker, which are illustrated more in detail in the other figures. For the present, it will be sufficient to understand that $a$, $b$, $c$ and $d$ represent four knives of a four-knife switch pivoted at their upper ends and connected by a yoke bar $e$; that this switch tends to move under spring action to idle position but is normally restrained by a gravity latch which is released when the relay $j$ has sufficient current flowing through it; that the circuit breaker has its lever automatically thrown into engagement when the current starts through the coil and is adapted to be suddenly released should the current fail.

Assuming that the motor is a single phase A. C. machine directly connected with the generator, and that the switch is closed, I will now trace the circuits shown in Fig. 1. 1 indicates one of the A. C. lines, which is connected to one of the main binding posts 2. From thence the current flows through the fuse 3 to the pivotal point 4 of the switch knife $a$, thence to the coöperating terminal 5 of that knife; thence to the line 6 and to one of the connections 7 of the single phase, alternating current motor M of the motor generator set. From the other connection 8 of this motor the line 9 leads to the switch terminal 10 which the knife $b$ connects with the pivotal point 11. This is connected by the fuse 12 with the other main binding post 13. From this binding post leads the other main A. C. line 14. From the switch terminal 10 a line 20 leads to the solenoid $r$ of the circuit breaker. From this solenoid a line 21 leads to a switch terminal 22 adapted to be engaged by the knife $a$ when closed. Accordingly, the circuit breaker is on the shunt across the A. C. line when closed by the main switch. From the circuits described, it is apparent that the closing of the main switch throws the A. C. current directly on the single phase motor and also causes the circuit breaker to move its lever to close the connection which it controls. That connection will now be described together with the battery lines.

One of the lines from the battery, connected with it by a suitable plug, not shown, is designated 30. This line leads to a pivotal point 31 of the knife switch $c$. From the co-operating terminal 32 of this switch a line 33 leads to the circuit breaker terminal $q$. This may be by means of a line 34 through the ammeter A to the line 35 or, in case it is desired to cut out the ammeter, a switch 36 bridges these lines. From the terminal $q$ the circuit is continued via the circuit breaker lever $s$ to the line 37 to one of the brushes 38 of the generator. From the other generator brush 39 the line 40 returns to the terminal 41 of the switch knife $d$ and from the pivotal point 42 of this switch the line 43 leads to the battery. Accordingly, the battery line is under the control of the circuit breaker on the A. C. line, and if the A. C. current should fail, the battery line is immediately opened, while, when the A. C. current resumes, the battery line is automatically closed.

Leading from the knife terminal 32 is a shunt line 50 which passes through a switch $k$ to the line 52 to the relay J, and from thence a line 53 passes through resistance R′ to the line 54 to the switch terminal 41. Accordingly, the relay is on a shunt across the battery line. As the counter-electromotive force of the battery increases, more current is thrown on this shunt, and hence the relay becomes stronger as the battery becomes charged, and when the battery is fully charged, the relay is strong enough to release the main switch, which automatically flying open, breaks both the A. C. and battery lines.

The generator is controlled by varying resistance in the field. Such resistance is indicated by R. A line 60 leads from it to one terminal of the field winding, while from the other terminal of the rheostat a line 61 leads to the switch terminal 62, which is connected by the knife $d$ with the line 40 from the armature brush 39. It is to be understood that the other terminal of the field coil is connected with the brush 38, or the armature line which leads thereto, as indicated at 65, so that the field is in a shunt across the armature.

It will be noticed that the circuit breaker has a special terminal 22 engaged by the knife $a$ of the main switch, while the field of the generator has a similar special terminal 62 engaged by the knife $d$. The terminals 5 and 41 for these two knives are of less height than the other terminals so that, on the closing of the switch, the knife $a$ engages the terminal 22 before the terminal 5 and the knife $d$ engages the terminal 62 before the terminal 41, these terminals 22 and 62 being engaged by their knives when the terminals 10 and 32 are engaging their knives $b$ and $c$. From this it results that, in closing the switch, the first operation is to close the circuit breaker in advance of the A. C. current motor, and the energized circuit breaker swings the lever $s$ to close the battery circuit. The battery circuit however, is closed first only through the field of the generator, as the armature circuit is open at the terminal 41. This allows the residual current in the battery to energize the field, so that it will be fully charged by the time the armature is closed, and by closing the battery current first on the field alone a very weak residual current may be effective for this purpose.

The drawing shows connections for closing the battery through the relay J adapted to be closed by an ampere-hour-meter, should the same be employed. When used the ampere-hour-meter magnet is in series with the battery and its needle is adapted to connect the two binding posts H. From one of these posts a line 70 leads to the battery line 43, and from the other post a line 71 leads to the line 53, heretofore described, from which the circuit continues through the relay J to the battery line 30. Accordingly, when the battery is fully charged the ampere-hour-meter directs the whole battery current through the relay, thus operating it to open the main switch and stop the charging operation. The drawing also illustrates a light controlled by a snap switch in a shunt across the A. C. line before the same reaches the main switch. This gives a continuous test of the A. C. line to show whether the current is flowing. This light, with the snap switch, is designated L, and from it one line 80 leads to the connection 11 of the fuse 12 of the switch knife $b$, while from the other side a line 81 leads to the connector 4 of the switch knife $a$ and the fuse 3.

I will now describe the mechanical details of the main switch, its latch and the releasing relay therefor, which are shown in Figs. 1 to 5 inclusive and 7. In these views, B represents the vertical insulating plate of the switch board, and *a, b, c* and *d* represent the four knives of the main switch pivotally mounted at their upper ends on the switch board B and connected at their lower ends to the operating bar *e*. *f* represents a pair of plungers each extending through the board B and surrounded by a tension spring *g* tending to draw it forward. These plungers bear against the rear side of the yoke *e* and tend to force the four-knife switch into idle position.

The switch is held in operative position by a pivoted latch bar *h* which overhangs the yoke *e*. Beneath this latch bar is the core *i* of the solenoid *j*, this core, when the solenoid is energized, being adapted to rise and strike the latch *h* and raise it free from the yoke *e*, whereupon the plungers *f* force the switch into idle position. The core *i* is shown as guided by having a rod *l* slide through a suitable guiding sleeve *n* carried on the bracket plate *p* which carries the solenoid.

In Figs. 2 and 6, *r* represents a laminated magnet formed for alternating current, and *s* is a switch lever controlled by this magnet, and carrying terminals *q*. The lever is shown as having a pair of toggle links *t, t*. one of which extends between shoulders *u* carried by the core *v* of the solenoid *r*. This device constitutes an automatic circuit closer and breaker, the raising of the core *v*, when the current flows through the winding *r*, giving a blow to the toggle and swinging it into the position shown in full lines in Fig. 6 to close the switch; while the dropping of the core when the current ceases gives a downward blow to the toggle to suddenly open the switch.

In the operation of my system it is simply necessary to plug the two battery lines 30 and 43 to the battery and close the main switch and allow the machinery to take care of itself. In closing the switch, the A. C. line through the solenoid and the field line through the controlling resistance are first closed; and this causes the circuit breaker to close the battery line and allows the residual current from the battery to flow through the field. This residual current first saturates the field, and then, when the switch is entirely closed, energizes both field and armature of this shunt wound generator, driving it as a motor, and speeding up the single phase alternating motor to give it sufficient speed to run from the alternating current. Thus the A. C. motor is driven by the alternating current, the generator armature line is closed and the battery is accordingly being charged. The switch is held in this position by the gravity latch engaging its yoke. When the battery has become fully charged, the current in the shunt through the relay J has increased sufficiently to cause it to pull up on its core, and this core releases the latch *h*, and the springs *g* acting on the plungers *f*, force out the knife switch and break the A. C. and battery circuits. The same action results in case of disconnection at the charging plug or breakage in the line to the battery, for such relief from the load causes the current from the generator in the shunt 53, 54 through the relay J to rise in voltage and operate the relay, and the latter immediately releases the switch, opening both the battery and A. C. lines.

If, during the running, for any reason the alternating current should fail, immediately the circuit breaker *r* drops its core, which strikes against the toggle links *t* and pulls the lever *s* away from the terminal *q*, breaking the battery line at this point. The main switch, however, remains closed and if, thereafter, the current should again start on the A. C. line, the energized circuit breaker automatically restores the lever *s* and reëstablishes the battery line and the battery current speeds up the motor generator until the A. C. current can continue it, when the charging goes on.

Having thus described my invention, what I claim is:

1. In a charging system for storage batteries, the combination, with the battery, of a direct current shunt wound generator, conductors adapted to connect them, and an alternating current single phase motor coupled with the generator and adapted to be driven by the latter from the residual battery current to speed up the alternating current motor after which it drives the generator, and means adapted to reëstablish the connections if the A. C. current fails and thereafter resumes.

2. In a storage battery charging system, the combination of a motor, a generator coupled therewith, circuits for driving current leading to the motor and battery circuits leading to the generator, a switch for controlling such circuits, and an electromagnetic control for the switch connected with the battery line.

3. In a storage battery charging system of the character set out, the combination, with a motor generator comprising an alternating current motor and a direct current shunt wound generator, of a switch for controlling the alternating current to the motor and the direct current from the generator, and mechanism under the control of the battery circuit for operating said switch whereby the system may be disconnected from the battery when it is fully charged.

4. In a storage battery charging system, the combination, with a source of current and a storage battery to be charged, of a motor generator, circuits between the motor and source of current and between the generator and battery, a main switch for simultaneously controlling both of said circuits, and an electro-magnetic controlling device for the switch connected with the battery circuit.

5. In a storage battery charging system, the combination, with a motor generator having an alternating current motor and a direct current generator, of main and battery circuits therefor, a switch for controlling such circuits, and electro-magnetic mechanism in a shunt on the battery line adapted to release the switch.

6. In a storage battery charging system, the combination of an A. C. motor, a direct current generator coupled therewith, main and battery circuits for the motor and generator respectively, and a circuit breaker for the battery circuit under the direct control of the main circuit.

7. In a storage battery charging system, the combination of a motor and a direct current generator coupled together, of main and battery circuits for the motor and generator respectively, a main switch controlling both circuits, electro-magnetic means on the battery line for controlling the switch, and electro-magnetic means on the main line for controlling the battery line.

8. In a storage battery charging system, the combination, with a motor and a direct current generator coupled therewith, of circuits for the motor and from the generator to the battery, a main multi-pole switch for concurrently controlling both the main and battery circuits, means tending to open said switch, a latch for holding it closed, and an electro-magnetic device on a shunt of the battery line adapted to operate said latch to release the switch.

9. In a storage battery charging system, the combination, with a source of current and a storage battery to be charged, of an alternating current motor and a direct current generator coupled therewith, of circuits for alternating current to the motor and for direct current between the generator and battery, a main switch for concurrently controlling both main and battery circuits, a spring tending to open said switch and a latch for holding it closed, an electro-magnetic device on a shunt of the battery line adapted to operate said latch to release the switch, and a circuit breaker having a magnet on a shunt across the A. C. line and having means operated by the magnet adapted to open or close a portion of the battery line.

10. In a storage battery charging system, the combination, with a source of current and a storage battery to be charged, of a motor and a generator coupled together, of circuits connecting the motor with a source of current and connecting the generator with the storage battery, and means for closing the battery circuit through the generator field in advance of the closing of the armature circuit of the generator.

11. In a storage battery charging system, the combination, with a source of current and a storage battery, of an alternating current motor and a direct current generator coupled together, circuits connecting the motor with a source of alternating current and connecting the generator with the storage battery, and a switch adapted to close said circuits, said switch closing the battery circuit through the generator field in advance of the armature circuit.

12. In a storage battery charging system, the combination, with a source of current and a storage battery to be charged, of a motor and a generator coupled together, of circuits connecting the motor with a source of current and connecting the generator with the storage battery, a switch adapted to close said circuits, and a circuit breaker controlling the battery circuit and having a magnet in a shunt across the main line, the switch being arranged to close said shunt in advance of closing the circuit through the motor.

13. In a storage battery charging system, the combination, with a source of current and a storage battery to be charged, of a motor and a generator coupled together, of circuits connecting the motor with a source of current and connecting the generator with the storage battery, a switch adapted to close both the main and battery circuits, said switch closing the battery circuit through the generator field in advance of the armature circuit, and a circuit breaker controlling the battery circuit and having a magnet in a shunt across the main line, the switch being arranged to close said shunt in advance of closing the circuit through the armature.

14. In a storage battery charging system, the combination, with a source of current and a storage battery to be charged, of a motor generator comprising an alternating current single phase motor and a direct current shunt wound generator coupled together, of circuits connecting the motor with a source of alternating current and connecting the generator with the storage battery, a switch adapted to close both of such circuits, said switch closing the battery circuit through the generator field in advance of the armature circuit, a circuit breaker controlling the battery circuit and having a magnet in a shunt across the A. C. line, the switch being arranged to close said shunt in advance of closing the circuit through the armature, and a relay and mechanism controlled by it for opening the switch, said relay being in a shunt across the battery line.

15. In a storage battery charging system, the combination, with a source of current and a storage battery to be charged, of a motor generator, of circuits between the motor and source of current and between the generator and battery, a main switch for governing both of said circuits, an electromagnetic controlling device for the switch connected with the battery circuit, and an ampere-hour-meter connection adapted to close the battery through said controlling device.

16. In a storage battery charging system, the combination, with a motor and a generator coupled therewith, of circuits for driving current to the motor and for charging current from the generator and battery, a main four-pole switch for concurrently controlling both main and battery circuits, means tending to open said switch and a latch for holding it closed, an electro-magnetic device on a shunt of the battery line adapted to operate said latch to release the switch, and ampere-hour-meter connections adapted to close the battery through the electro-magnetic device.

In testimony whereof, I hereunto affix my signature in the presence of two witnesses.

JAMES F. LINCOLN.

Witnesses:
 ALBERT H. BATES,
 BRENNAN B. WEST.